(12) United States Patent
Kasamatsu

(10) Patent No.: US 8,233,599 B2
(45) Date of Patent: Jul. 31, 2012

(54) COMMUNICATION APPARATUS

(75) Inventor: Daisuke Kasamatsu, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1045 days.

(21) Appl. No.: 12/163,603

(22) Filed: Jun. 27, 2008

(65) Prior Publication Data

US 2009/0003565 A1 Jan. 1, 2009

(30) Foreign Application Priority Data

Jun. 29, 2007 (JP) ................................ P2007-173104

(51) Int. Cl.
*H04M 11/00* (2006.01)
(52) U.S. Cl. .............................. 379/110.01; 379/100.16
(58) Field of Classification Search ............. 379/110.01, 379/100.16; 455/462
See application file for complete search history.

(56) References Cited

U.S. PATENT DOCUMENTS

| 2003/0216146 A1* | 11/2003 | Otsuka .......................... 455/462 |
| 2005/0099997 A1 | 5/2005 | Kuwabara et al. |
| 2005/0232247 A1 | 10/2005 | Whitley et al. |

FOREIGN PATENT DOCUMENTS

| CN | 1426220 A | 6/2003 |
| EP | 1011278 A2 | 6/2000 |
| EP | 1376996 A2 | 1/2004 |
| JP | 2005-33662 | 2/2005 |
| JP | 2006-270252 | 10/2006 |
| JP | 2007-20084 | 1/2007 |
| WO | 2004116412 A2 | 12/2004 |

OTHER PUBLICATIONS

The People's Republic of China Patent Office; Notification of First Office Action in Chinese Patent Application No. 200810129564.X (counterpart to the above-captioned US Patent Application) mailed on Sep. 2, 2010.
European Patent Office; European Search Report in European Patent Application No. 08252228.5-2414 (counterpart to the above-captioned U.S. patent application) mailed Jun. 12, 2009.
European Telecommunications Standards Institute, Digital Enhanced Cordless Telecommunications (DECT); DECT access to IP Networks, Oct. 2004, ETSI TS 102 265 V1.2.1, France.
Matthias Oliver Berger and Olaf Kubitz European Centre for Mechatronics and Informatik 4, DECT for Factory Communication, ISIE '97—Guimaraes, Portugal, IEEE Catalog No. 97TH8280, pp. 106-111, Portugal.

\* cited by examiner

*Primary Examiner* — Stella Woo
(74) *Attorney, Agent, or Firm* — Baker Botts L.L.P.

(57) ABSTRACT

A communication apparatus includes a main unit connectable to the Internet and at least one secondary unit that is connectable to the Internet via the main unit. The main unit includes, a communication control unit that controls telephone communication with an external apparatus via the Internet, a storing unit that stores at least one user ID assigned individually to at least one user authorized to use the communication control unit in association with the main unit and the at least one secondary unit and an activating unit that is capable of activating the communication control unit for each user ID.

7 Claims, 9 Drawing Sheets

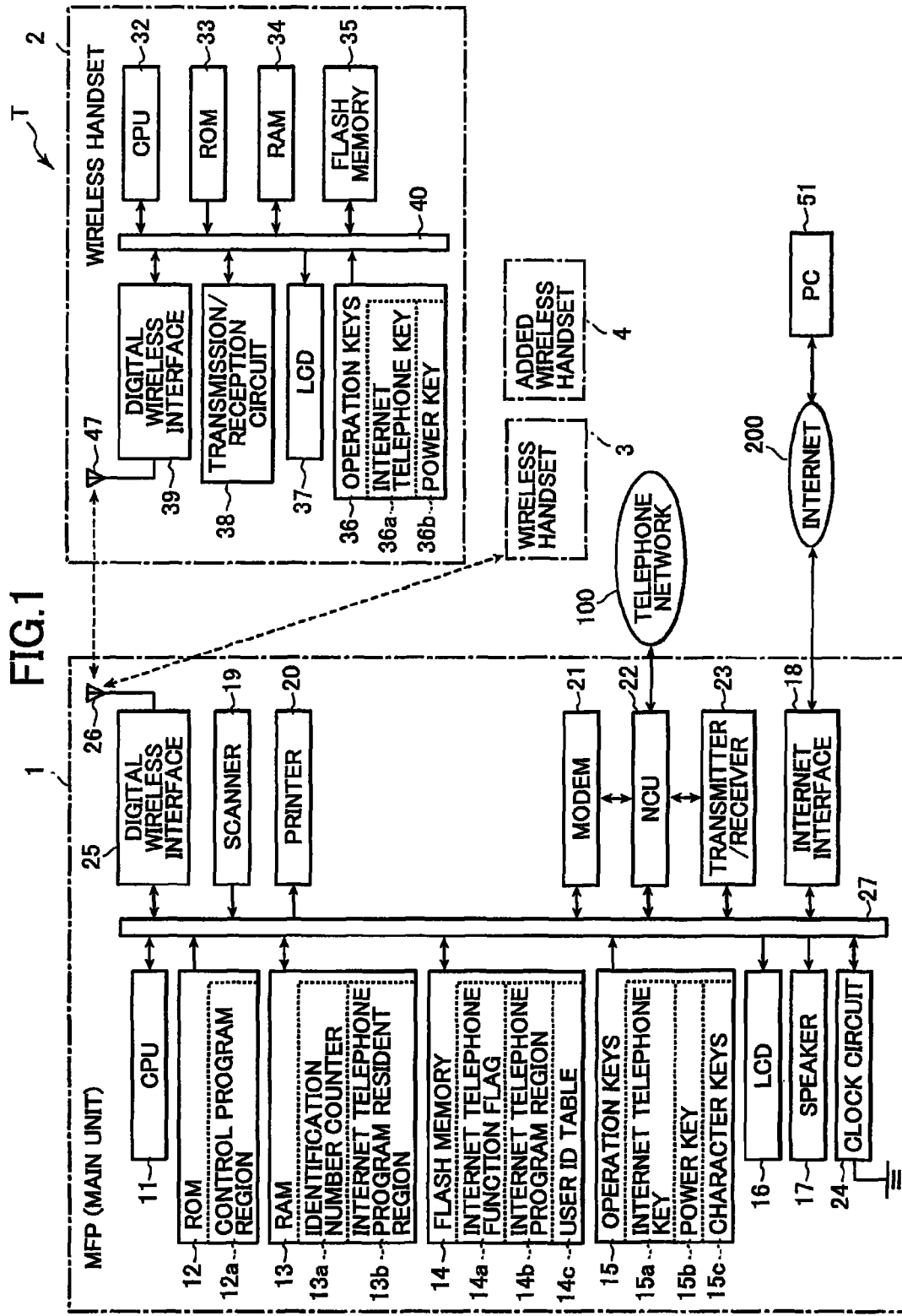

| IDENTIFICATION NUMBER (14c1) | USER ID (14c2) | INTERNET TELEPHONE PROGRAM STORAGE ADDRESS (14c3) |
|---|---|---|
| 0 | xyz | 0x000 |
| 1 | xyz1 | 0x100 |
| 2 | xyz2 | 0x200 |
| 3 | abc | 0x300 |

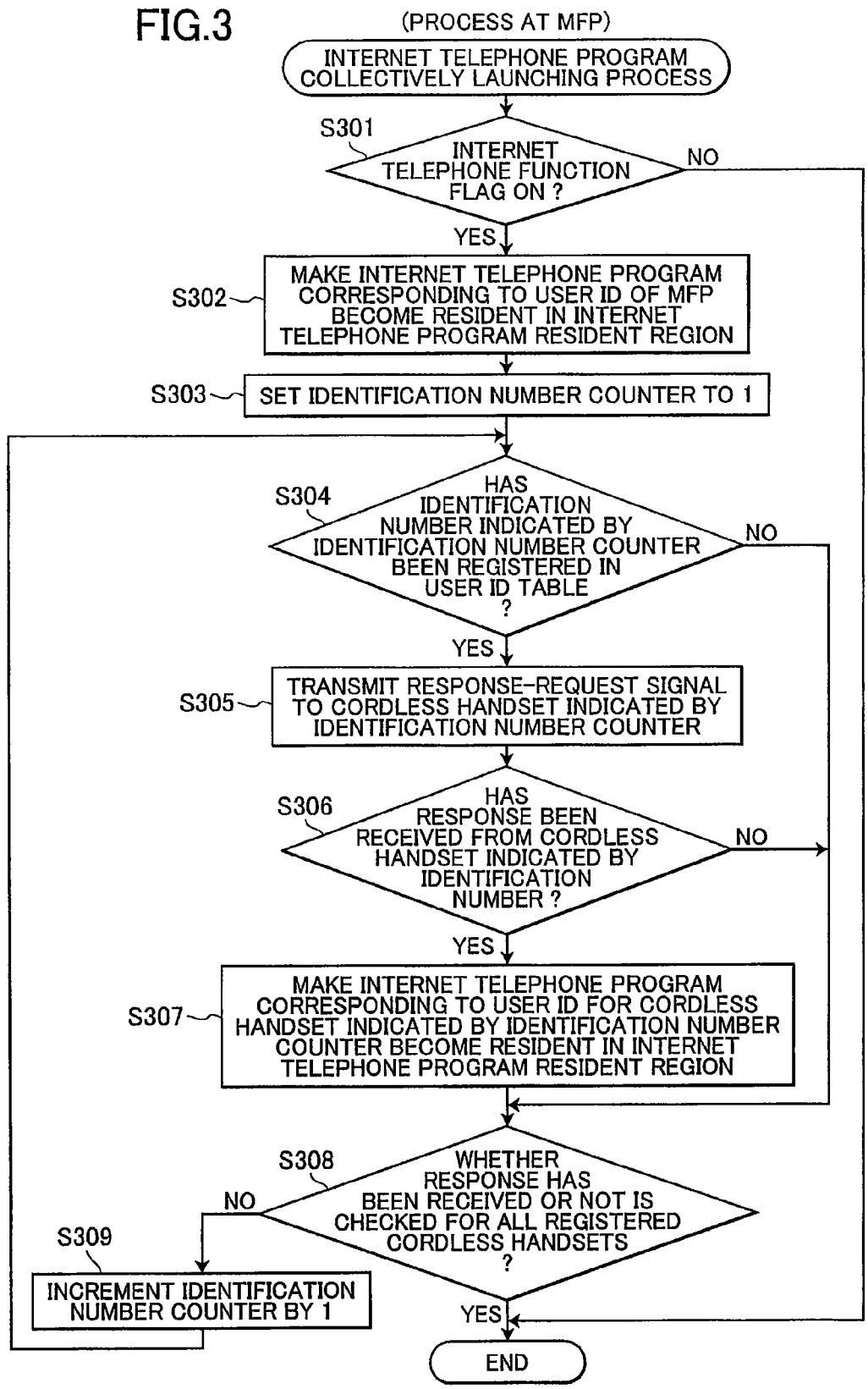

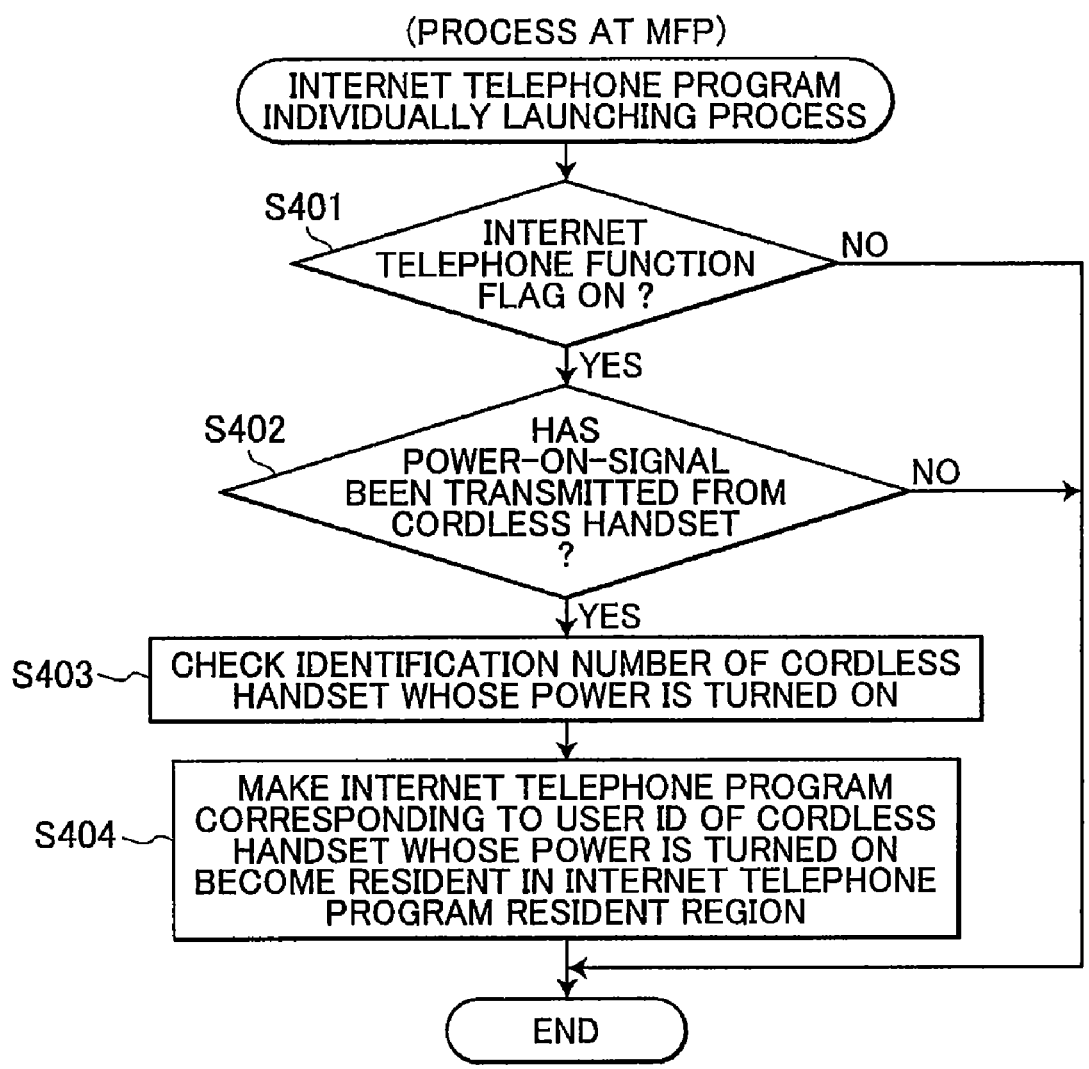

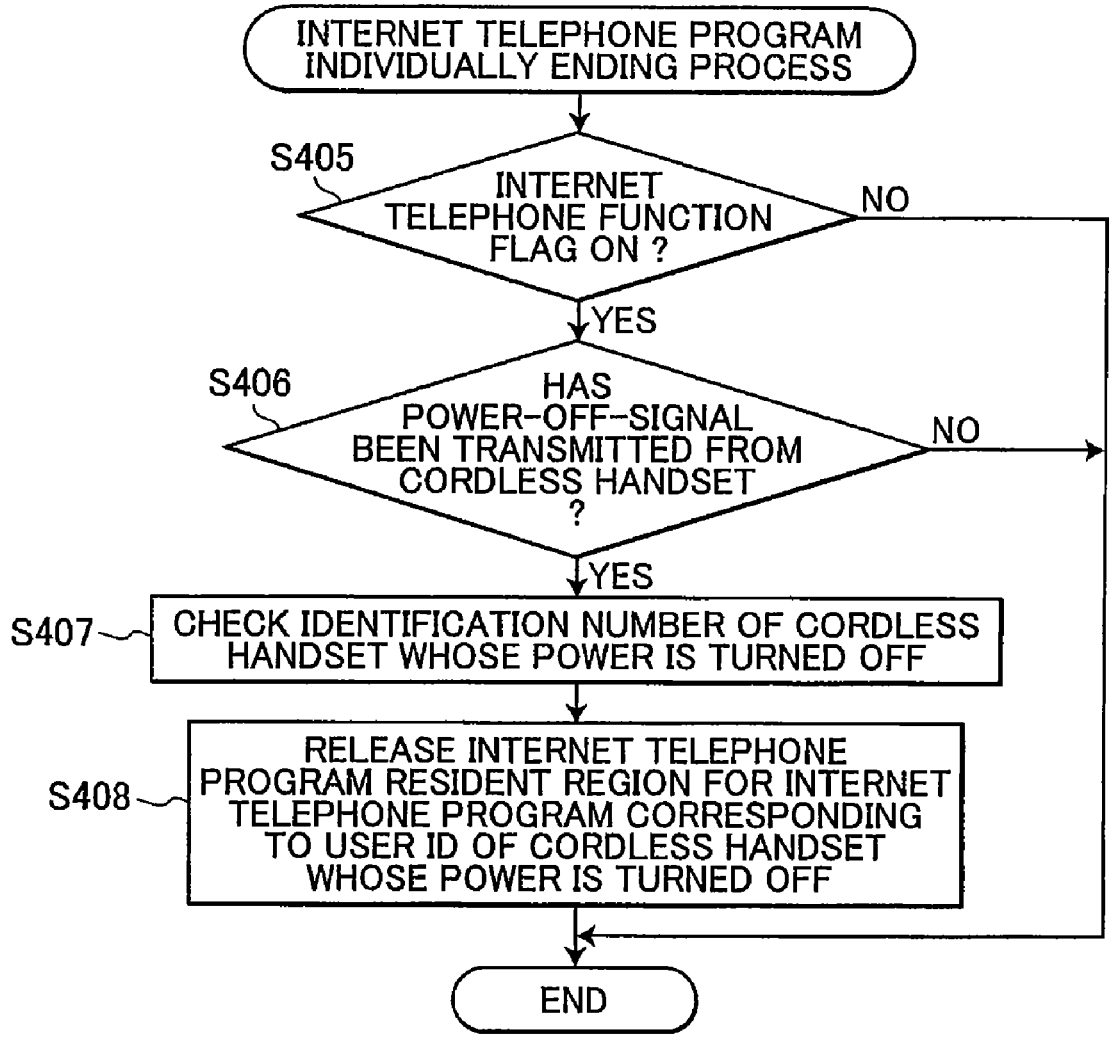

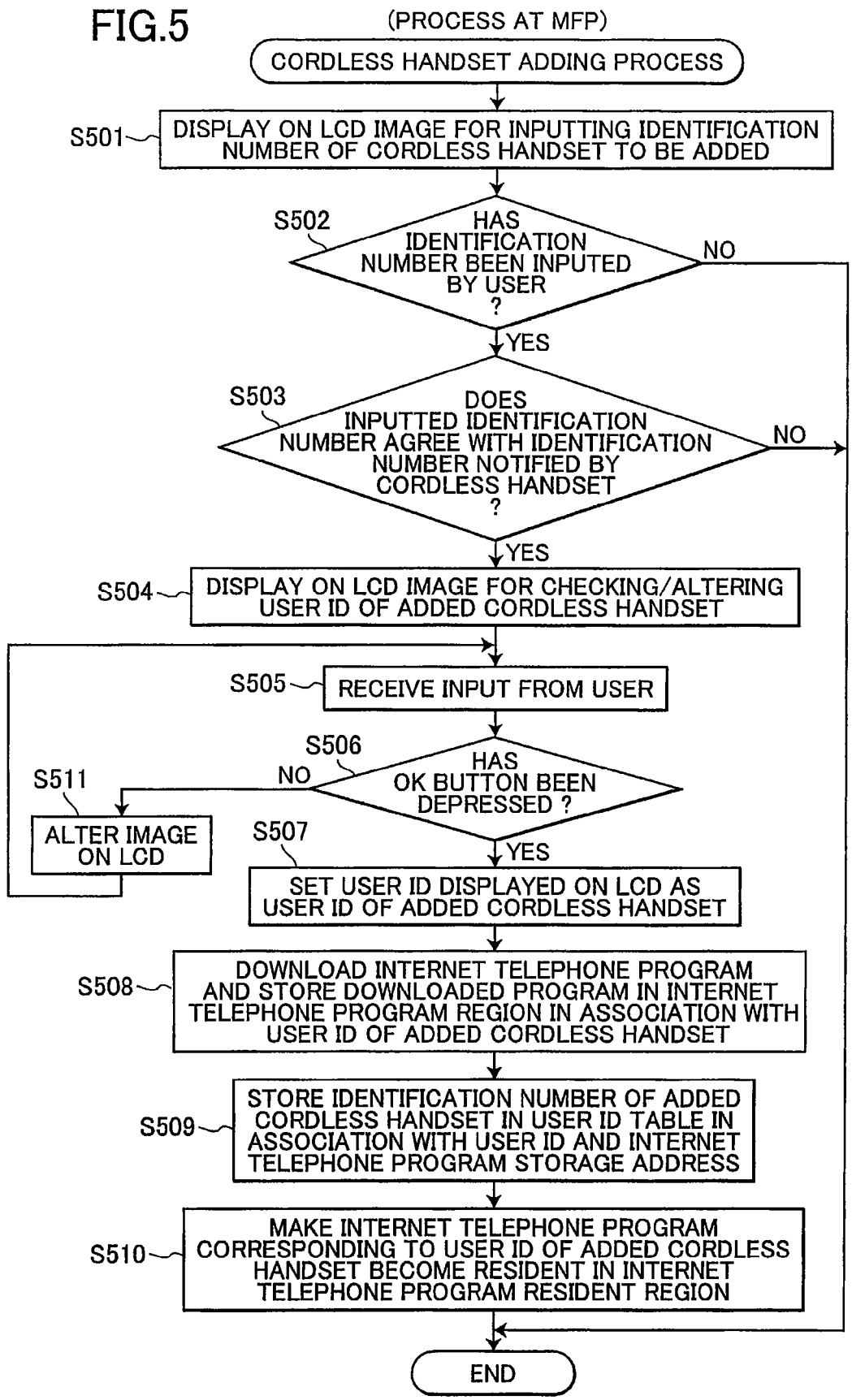

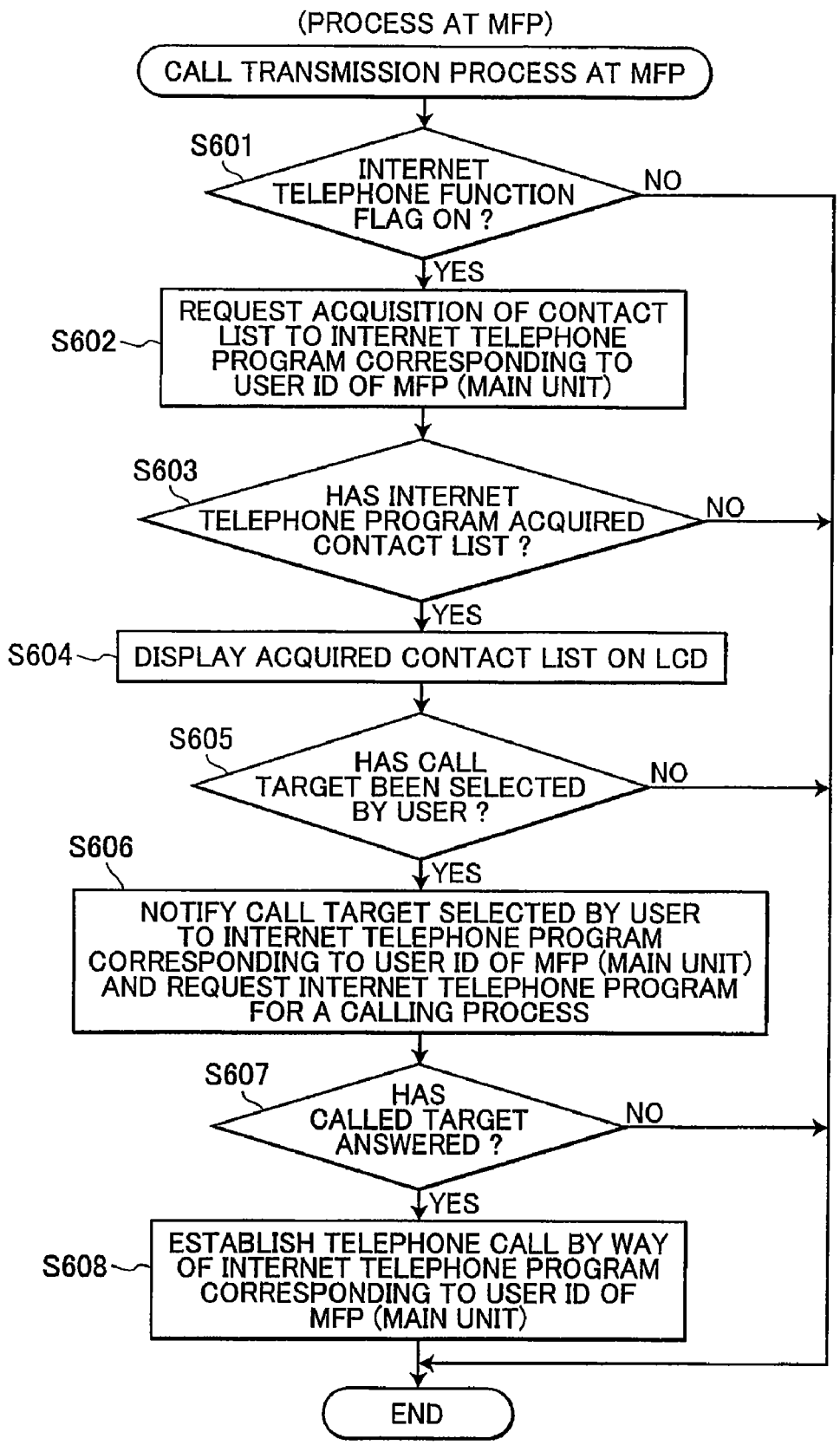

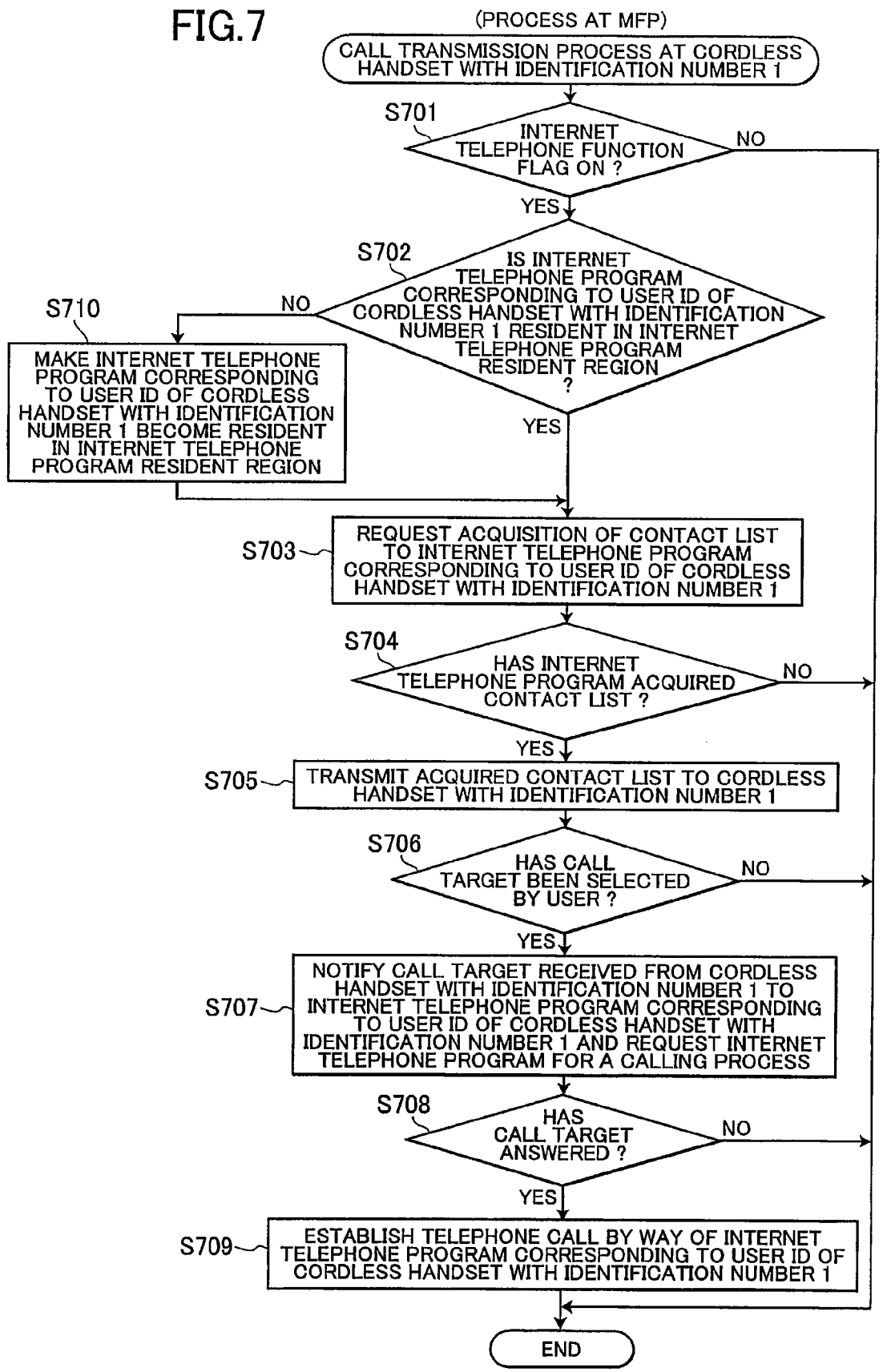

COMMUNICATION APPARATUS

CROSS REFERENCE TO RELATED APPLICATION

This application claims priority from Japanese Patent Application No. 2007-173104 filed Jun. 29, 2007. The entire content of this priority application is incorporated herein by reference.

TECHNICAL FIELD

The present invention relates to a communication apparatus having a main unit and a secondary unit.

BACKGROUND

Internet telephone communication for communicating with external apparatus via the Internet is known. Personal computers were generally utilized as terminal units for performing the Internet telephone communication in the initial stages of dissemination of the Internet telephone communication. However, in recent years, an increasing number of telephone sets are utilized as terminal units for performing the Internet telephone communication.

For instance, Japanese unexamined patent application publication No. 2006-270252 describes a mobile telephone that can be utilized for performing the Internet telephone communication. The mobile telephone stores in advance an operation program for performing the Internet telephone communication, (to be referred to as "Internet telephone program" hereinafter). After the mobile telephone is connected to a personal computer via a USB cable, the personal computer automatically starts executing the Internet telephone program so that the mobile telephone can perform the Internet telephone communication.

SUMMARY

On the other hand, a communication apparatus having a main unit that can be connected to the Internet and a secondary unit that can be connected to the Internet via the main unit are known. There is a demand for using such a communication apparatus as a terminal for performing the Internet telephone communication. In this case, it is conceivable that the main unit stores the Internet telephone program and performs the Internet telephone communication.

However, in a situation where users desire to use both the main unit and the secondary unit to perform the Internet telephone communication, if the Internet telephone program is started at the main unit, the main unit will exclusively use the Internet telephone program while the main unit performs the Internet telephone communication. So, the secondary unit cannot perform the Internet telephone communication, while the main unit performs the Internet telephone communications.

In view of the above-identified problem, an object of the present invention is to provide a communication apparatus whose main unit and secondary units can communicate with external apparatuses via the Internet simultaneously with one another.

In order to attain the above and other objects, the invention provides a communication apparatus including: a main unit connectable to the Internet; and at least one secondary unit that is connectable to the Internet via the main unit. The main unit includes: a communication control unit that controls telephone communication with an external apparatus via the Internet; a storing unit that stores at least one user ID assigned individually to at least one user authorized to use the communication control unit in association with the main unit and the at least one secondary unit; and an activating unit that is capable of activating the communication control unit for each user ID.

BRIEF DESCRIPTION OF THE DRAWINGS

FIG. 1 is a schematic block diagram of a communication apparatus, showing the electric configuration thereof;

FIG. 3 is a flowchart of an Internet telephone program collectively launching process executed by an MFP;

FIG. 4A is a flowchart of an Internet telephone program individually launching process executed by the MFP;

FIG. 4B is a flowchart of an Internet telephone program individually ending process executed by the MFP;

FIG. 5 is a flowchart of a wireless handset adding process executed by the MFP;

FIG. 6 is a flowchart of an MFP call transmission process executed by the MFP;

FIG. 7 is a flowchart of a wireless handset (ID No. 1) call transmission process executed by the MFP.

DETAILED DESCRIPTION

Figures 2A, 2B:
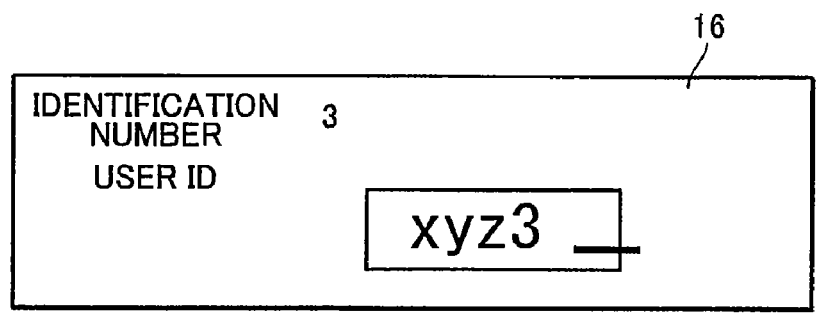
FIG. 2A is a schematic illustration of a user ID table, showing the contents thereof.
FIG. 2B is a schematic illustration of a user ID checking/altering screen for an added wireless handset displayed on an LCD.

Next, an embodiment of the present invention will be described while referring to the accompanying drawings. FIG. 1 is a schematic block diagram of a communication apparatus T according to the embodiment of the present invention, showing the electric configuration thereof. The communication apparatus T includes a multi-function peripheral (to be simply referred to as "MFP" hereinafter) 1, a wireless handset 2 and another wireless handset 3. The communication apparatus T can be added with one or more wireless handset 4. Note that the wireless handset 3 and the added wireless handset 4 have an electric configuration the same as the wireless handset 2.

Of the communication apparatus T, the MFP 1, the wireless handset 2 and the wireless handset 3 can perform an Internet telephone communication simultaneously with one another. When one or more wireless handset 4 is added to the communication apparatus T, the added wireless handset 4 can also perform the Internet telephone communication simultaneously with the MFP 1, the wireless handset 2 and the wireless handset 3.

The Internet telephone communication is a telephone service of allowing the communication apparatus 1 to make a telephone call or telephone communication with a personal computer (to be also referred to as "PC" hereinafter) 51 via the Internet 200. "SKYPE (registered trademark)" developed by Skype Technologies may be a well-known example of the Internet telephone service.

The MFP 1 is an apparatus having a variety of functions including telephone, facsimile, printer, scanner and copier. The MPP 1 is designed to be connectable to the Internet 200 so as to perform the Internet telephone communication via the Internet 200.

Additionally, the MFP 1 serves as a main unit for connecting each of the wireless handset 2 and the wireless handset 3 to the Internet 200. Therefore, each of the wireless handset 2 and the wireless handset 3 can perform the Internet telephone communication via the Internet 200. When the one or more wireless handset 4 is added to the communication apparatus T, the MFP 1 operates as a main unit also for the added wireless handset 4.

The MFP 1 has a CPU (central processing unit) 11, a ROM (read only memory) 12, a RAM (random access memory) 13, a flash memory 14, operation keys 15, a liquid crystal display (LCD) 16, a speaker 17, an Internet interface 18, a scanner 19, a printer 20, a modem 21, an NCU (network control unit) 22, a transmitter/receiver 23, a clock circuit 24 and a digital wireless interface 25, which are connected to one another via a bus line 27.

The CPU 11 is a processing unit that controls each of the components in the MFP 1 that are connected to the CPU 11 by way of the bus line 27. The CPU 11 controls each component according to fixed values and programs stored in the ROM 12, the RAM 13 and the flash memory 14 and also according to various signals the CPU 11 receives and transmits by way of the Internet interface 18, the NCU 22 and the digital wireless interface 25.

Figure 8:
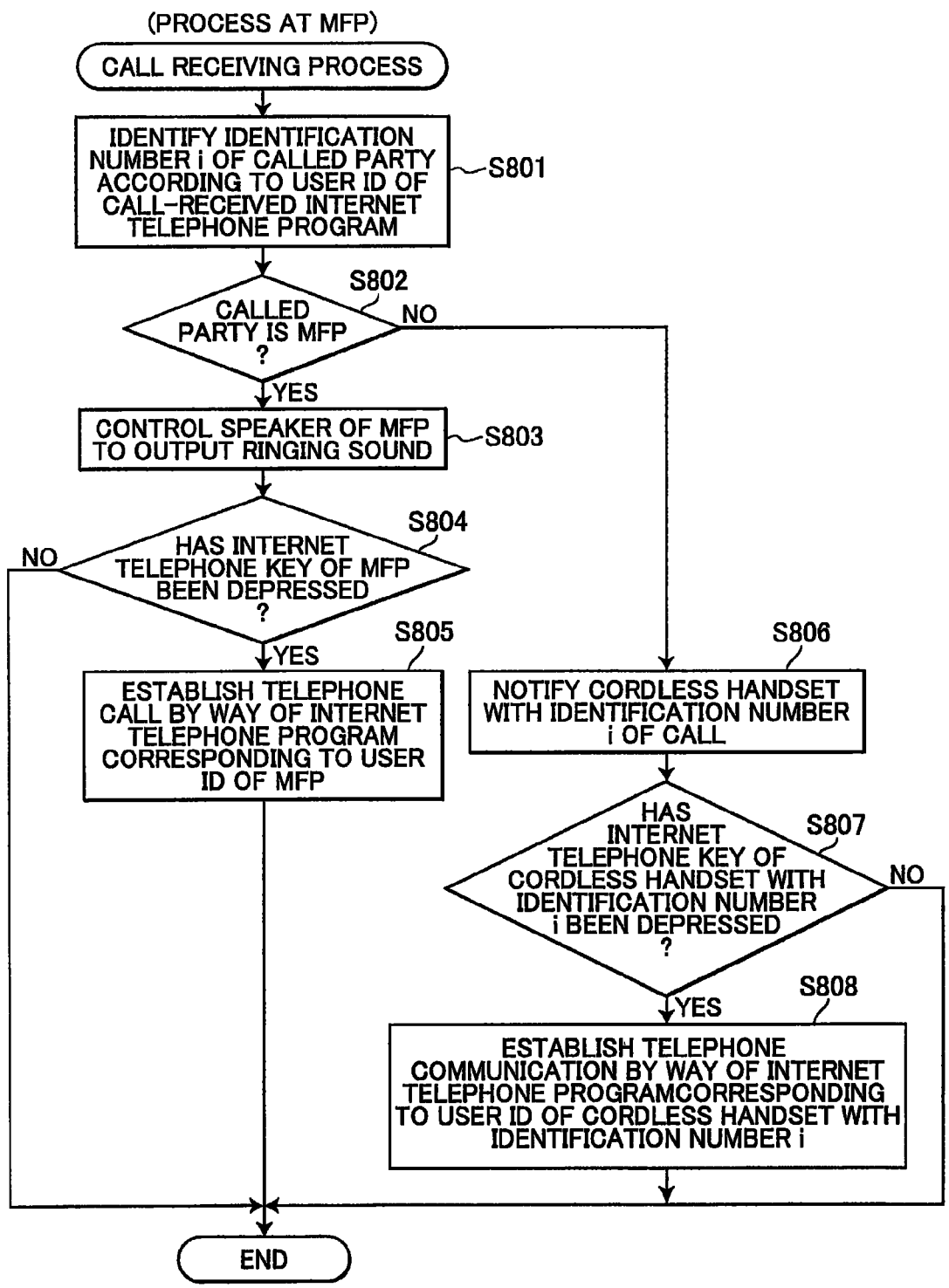
FIG. 8 is a flowchart of a call receiving process executed by the MFP.

The ROM 12 is an unrewritable memory having a control program region 12a that stores various control programs executed by the CPU 11. More specifically, the control program region 12a stores programs for executing an Internet telephone program collectively launching process as illustrated by the flowchart of FIG. 3, an Internet telephone program individually launching process as illustrated by the flowchart of FIG. 4A, an Internet telephone program individually ending process as illustrated by the flowchart of FIG. 4B, a wireless handset adding process as illustrated by the flowchart of FIG. 5, a MFP call transmission process as illustrated by the flowchart of FIG. 6, a wireless handset (identification number 1) call transmission process as illustrated by the flowchart of FIG. 7 and a call receiving process as illustrated by the flowchart of FIG. 8, all of which will be described in greater detail later.

The flash memory 14 is a rewritable and nonvolatile memory. Data stored in the flash memory 14 is retained after the power source of the MFP 1 is turned off. The flash memory 14 is provided with an Internet telephone function flag 14a, an Internet telephone program region 14b and a user ID table 14c.

The Internet telephone function flag 14a is a flag for indicating whether or not the communication apparatus T is allowed to use the Internet telephone function. The MFP 1, the wireless handset 2 and the wireless handset 3 can perform the Internet telephone communication when the Internet telephone function flag is on. On the other hand, the MFP 1, the wireless handset 2 and the wireless handset 3 are prohibited from performing the Internet telephone communication when the Internet telephone function flag is off. The user can turn the Internet telephone function flag 14a on and off by operating the operation keys 15. Thus, by turning on the Internet telephone function flag 14a, the user can set the communication apparatus T into a state where communication apparatus T can perform the Internet telephone communication.

The Internet telephone program region 14b stores a plurality of Internet telephone programs that are in one to one correspondence with user IDs of the MFP 1, the wireless handset 2 and the wireless handset 3. The Internet telephone program for the user ID of each of the MFP 1, the wireless handset 2 and the wireless handset 3 is dedicated for the subject one of the MFP 1, the wireless handset 2 and the wireless handset 3.

The Internet telephone program is an operation program for executing processes necessary for performing the Internet telephone communication. The processes include: transmitting a call signal to the PC 51; receiving a call signal from the PC 51; and performing a communication with the PC 51 by modulating, into data, an audio signal received from the transmitter/receiver 23 of the MFP 1, a transmission/reception circuit 38 of the wireless handset 2 or a transmission/reception circuit (not shown) of the wireless handset 3 and transmitting the modulated data to the PC 51 and by demodulating data received from the PC 51 into an audio signal and outputting the audio signal to the transmitter/receiver 23 of the MFP 1, the transmission/reception circuit 38 of the wireless handset 2 or the transmission/reception circuit (not shown) of the wireless handset 3.

When the wireless handset 4 is added to the communication apparatus T, the MFP 1 downloads another Internet telephone program by way of the Internet 200 and stores the Internet telephone program in the Internet telephone program region 14b as a program corresponding to a user ID that is newly set for the added wireless handset 4.

The user ID table 14c stores: the user IDs assigned respectively to the MFP 1, the wireless handset 2 and the wireless handset 3; and data indicating storage addresses where the Internet telephone programs corresponding to the respective user IDs are stored in the Internet telephone program region 14b; in association with identification numbers assigned to the MFP 1, the wireless handset 2 and the wireless handset 3. User IDs are identification information used in the Internet and assigned to individual users who are authorized to use the Internet telephone programs. A plurality of users who can use the Internet telephone function can be identified by the user IDs.

Identification numbers are used in the communication apparatus T. Identification numbers are for identifying the MFP 1, the wireless handset 2 and the wireless handset 3 when they perform the Internet telephone communication with the PC 51, when they communicate with an external apparatus (not shown) via a telephone network 100, and when they communicate with one another within the communication apparatus T via an extension line. In other words, the MFP 1, the wireless handset 2 and the wireless handset 3 are managed by the identification numbers assigned thereto inside the communication apparatus T.

When the wireless handset 4 is added to the communication apparatus T, a user ID, which is newly set for the added wireless handset 4, and a storage address of the Internet telephone program region 14b where the Internet telephone program corresponding to the user ID of the added wireless handset 4 is stored, are added to the user ID table 14c in association with an identification number also newly assigned to the added wireless handset 4.

Here, the user ID table 14c will be described in greater detail with reference to FIG. 2A. FIG. 2A is a schematic illustration of the user ID table 14c, showing the contents thereof when the wireless handset 4 is added to the communication apparatus T. The user ID table 14c stores the user IDs 14c2 and the Internet telephone program storage addresses 14c3 in association with the identification numbers 14c1 of the MFP 1, the wireless handset 2, the wireless handset 3 and the added wireless handset 4. When the wireless handset 4 is not yet added to the communication apparatus T, the user ID table 14c stores the user IDs 14c2 and the Internet telephone program storage addresses 14c3 in association with the identification numbers 14c1 of the MFP 1, the wireless handset 2 and the wireless handset 3.

In the user ID table 14c, the column of identification numbers 14c1 lists up the identification numbers assigned to the MFP 1, the wireless handset 2, the wireless handset 3 and the added wireless handset 4. "0" is the identification number of the MFP 1 and "1" is the identification number of the wireless handset 2, while "2" is the identification number of the wireless handset 3 and "3" is the identification number of the added wireless handset 4.

The column of user IDs 14c2 lists up the user IDs defined for the MFP 1, the wireless handset 2, the wireless handset 3 and the added wireless handset 4 in association with the identification numbers 14c1. As shown in FIG. 2A, user ID "xyz" of the MFP 1 is associated with the identification number "0" and user ID "xyz1" of the wireless handset 2 is associated with the identification number "1", while user ID "xyz2" of the wireless handset 3 is associated with the identification number "2" and user ID "abc" of the added wireless handset 4 is associated with the identification number "3".

The column of Internet telephone program storage addresses 14c3 lists up, in association with the identification numbers 14c1, the storage addresses where the Internet telephone programs for the user IDs of the MFP 1, the wireless handset 2, the wireless handset 3 and the added wireless handset 4 are stored in the Internet telephone program region 14b. As shown in FIG. 2A, storage address "0x000" where the Internet telephone program for the MFP 1 is stored is associated with the identification number "0". The storage address "0x100" where the Internet telephone program for the wireless handset 2 is stored is associated with the identification number "1". The storage address "0x200" where the Internet telephone program for the wireless handset 3 is stored is associated with the identification number "2". The storage address "0x300" where the Internet telephone program for the added wireless handset 4 is stored is associated with the identification number "3".

The RAM 13 is a rewritable memory for temporarily storing various programs and data. The RAM 13 has an identification number counter 13a and an Internet telephone program resident region 13b. The identification number counter 13a is used during the Internet telephone program collectively launching process of FIG. 3.

When the Internet telephone program for one of the user IDs of the 1, 2, 3 and 4 is started, the Internet telephone program is read out from the Internet telephone program region 14b in the flash memory 14 and is made to become resident in the Internet telephone program resident region 13b.

When the started Internet telephone program becomes resident in the Internet telephone program resident region 13b, Internet telephone function becomes available by means of the resident Internet telephone program.

The Internet telephone programs can be started for the user IDs for the MFP 1 and the wireless handsets 2-4 individually. The started Internet telephone programs become resident in the Internet telephone program resident region 13b. Each of the MFP 1 and the wireless handsets 2-4 can perform the Internet telephone communication by means of an Internet telephone program that corresponds to the corresponding user ID and that become resident in the Internet telephone program resident region 13b.

The Internet telephone program corresponding to the user ID of the MFP 1 is started when the power source of the MFP 1 is turned on. The Internet telephone program corresponding to the user ID of the wireless handset 2 is started when the power source of the MFP 1 is turned on, provided that the power source of the wireless handset 2 has been on when the power source of the MFP is turned on. The Internet telephone program corresponding to the user ID of the wireless handset 2 is started also when the power source of the wireless handset 2 is turned on, provided that the power source of the MFP 1 has been on when the power source of the wireless handset 2 is turned on. The Internet telephone programs corresponding to the user IDs of the wireless handsets 3 and 4 are started at the same timing as in the case of the wireless handset 2.

On the other hand, when the power of the wireless handset 2 or the wireless handset 3 is turned off, the Internet telephone program corresponding to the user ID of the wireless handset whose power source is turned off is stopped and the region of the Internet telephone program resident region 13b where the stopped Internet telephone program has been resident is released.

When the wireless handset 4 is added, the Internet telephone program is started for the user ID defined for the added wireless handset 4 and becomes resident in the Internet telephone program resident region 13b. Then, as a result, the Internet telephone becomes available to the added wireless handset 4.

As described above, in the communication apparatus T, the MFP 1, the wireless handset 2, the wireless handset 3 and the added wireless handset 4 are managed by the identification numbers assigned thereto. The user ID and the Internet telephone program storage areas can be managed easily by storing the user IDs and the Internet telephone program storage addresses for the MFP 1, the wireless handset 2, the wireless handset 3 and the added wireless handset 4 in association with the identification numbers thereof.

For instance, in order to transmit a call signal to the PC 51 by using the Internet telephone function, the MFP 1 identifies the user ID for the MFP 1, the wireless handset 2, the wireless handset 3, or the added wireless handset 4, whose Internet telephone key is depressed, by referring to the user ID table 14c. Then, the MFP 1 transmits a call signal to the PC 51 by using the Internet telephone program that corresponds to the identified user ID and that is resident in the Internet telephone program resident region 13b. When one of the Internet telephone programs resident in the Internet telephone program resident region 13b receives a call signal from the PC 51, the MFP 1 identifies the identification number of a called party among the MFP 1, the wireless handset 2, the wireless handset 3 and the added wireless handset 4 based on the user ID that corresponds to the Internet telephone program that has received the call signal by referring to the user ID table 14c. Then, the MFP 1 notifies the called party of the reception of the call (the MFP 1, the wireless handset 2, the wireless handset 3 or the added wireless handset 4).

In order to start one of the Internet telephone programs stored in the Internet telephone program region 14b for the user ID set for the MFP 1, the wireless handset 2, the wireless handset 3 or the added wireless handset 4, the MFP 1 determines the storage address where the Internet telephone program for the user ID is stored, by referring to the user ID table 14c. Then, the MFP 1 reads out the Internet telephone program from the storage address, and starts the program.

Next, the operation keys 15 will be described with reference to FIG. 1. The operation keys 15 function as input buttons for selecting one of the functions of scanner, printer and facsimile and for giving instructions for the various operations. The operation keys 15 include an Internet telephone key 15a, a power key 15b and character keys 15c.

The Internet telephone key 15a is used for performing the Internet telephone communication by directing transmission of a call signal or answering to an incoming call signal. The power key 15b is used for turning on/off the power source of the MFP 1. The character keys 15c are used for inputting characters and numerals. When the wireless handset 4 is added to the communication apparatus T, the character keys 15c are operated by the user to input his/her desired user ID for the wireless handset 4.

The LCD 16 displays a menu or a current status of operation of the communication apparatus T according to the operation of the operation keys 15. As the user operates some of the operation keys 15, the LCD 16 displays information that corresponds to the operation. When the MFP 1 is operated to transmit a call signal by the Internet telephone function, the LCD 16 displays a contact list that indicates users who can use the Internet telephone communication. When adding the wireless handset 4 to the communication apparatus T, the LCD 16 displays a user ID check/alteration screen that prompts the user to check and, if necessary, change the user ID for the wireless handset 4.

The speaker 17 outputs various sounds depending on the current status of operation of the communication apparatus T (such as an operation sound of the operation keys 15, a warning sound when an error occurs or a call sound when a call signal is received) to notify the user of the status.

The Internet interface 18 is connected to the Internet 200 so as to perform data communication and the Internet telephone communication according to the Internet protocol with an external apparatus such as the PC 51.

The scanner 19 reads, according to a command issued from the CPU 11, an image from an original placed on an original reading table (not shown) that is provided in the scanner 19. The scanner 19 generates image data that can be displayed on the LCD 16 and that can be printed by the printer 20. When the MFP 1 is set in a facsimile mode or a scanner mode, the image data generated by the scanner 19 is stored in a predetermined memory region of the RAM 13.

The printer 20 prints, according to an instruction from the CPU 11, an image on a sheet of recording paper held in a sheet feeding cassette (not shown) provided in the printer 20.

According to an instruction from the CPU 11, the modem 21 modulates transmission data stored in the RAM 13 into an image signal and transmits the image signal via the NCU 22 to the telephone network 100. The modem 21 receives an image signal from the telephone network 100 via the NCU 22 and demodulates the image signal into image data that the LCD 16 can display and the printer 20 can print.

The NCU 22 is connected to the telephone network 100 so as to control the operation of transmitting a dialing signal to the telephone network 100 and of answering to a call signal received from the telephone network 100.

The transmitter/receiver (handset) 23 is a device for performing telephone communication with the wireless handset 2, 3, or 4 or an external apparatus (not shown) connected to the MFP 1 via the telephone network 100 and for performing Internet telephone communication with the PC 51 connected to the the MFP 1 via the Internet 200. The transmitter/receiver 23 has a microphone (not shown) that transforms sound into an audio signal and a speaker (not shown) that transforms an audio signal into sound and outputs (emits) the sound to the outside.

The clock circuit 24 is a known circuit that has an internal clock for measuring time, and that compare the current time with the time when the clock circuit 24 has started measuring time and determines the elapsed time. The clock circuit 24 is used to measure the lengths of the elapsed time during the processes illustrated in the flowcharts of FIGS. 3 through 8.

The digital wireless interface 25 is connected to a wireless antenna 26. The digital wireless interface 25 is for performing wireless communication between the MFP 1 and the wireless handset 2 or 3. When the wireless handset 4 is added to the communication apparatus T, the MFP 1 and the added wireless handset 4 is also wirelessly connected with each other via the digital wireless interface 25.

When the wireless handset 2, 3 or 4 performs the Internet telephone communication, the wireless handset 2, 3 or 4 is connected to the Internet 200 by way of the digital wireless interface 25, the bus line 27 and the Internet interface 18.

As shown in FIG. 1, the wireless handset 2 mainly includes a CPU 32, a ROM 33, a RAM 34, a flash memory 35, operation keys 36, an LCD 37, a transmission/reception circuit 38 and a digital wireless interface 39 which are connected to one another by way of a bus line 40.

The CPU 32 is a processing unit that controls the components, of the wireless handset 2, which are connected to the CPU 32 via the bus line 40, according to fixed values and programs stored in the ROM 33, the RAM 34 and the flash memory 35 and also according to various signals the CPU 32 receives and transmits by way of the digital wireless interface 39.

The ROM 33 is an unrewritable memory that stores various control programs executed by the wireless handset 2. The RAM 34 is a rewritable memory for temporarily storing various data. The flash memory 35 is a rewritable and nonvolatile memory. Data stored in the flash memory 35 is retained even after the power source of the wireless handset 2 is turned off.

The operation keys 36 are operated to control the wireless handset 2 to perform the Internet telephone communication. The operation keys 36 typically include numeral buttons (ten keys), a talk button and function buttons. The operation keys 36 also include an Internet telephone key 36a and a power key 36b. The Internet telephone key 36a is for directing transmission of a call signal and answering to an incoming call signal to perform the Internet telephone communication by using the wireless handset 2. The power key 36b is for turning on/off the power source of the wireless handset 2.

When the power source of the wireless handset 2 is turned on by means of the power key 36b, the CPU 32 detects the power-on state and transmits a power-on signal to the MFP 1. When the power source of the wireless handset 2 is turned off, the CPU 32 detects the power-off state and transmits a power-off signal to the MFP 1.

The LCD 37 is used for managing the wireless handset 2 and for displaying the contact list when the wireless handset 2 is operated by a user to perform the Internet telephone communication. The LCD 37 also displays various kinds of information such as that the wireless handset 2 is in a busy state or in a standby state regarding the Internet telephone communication.

The transmission/reception circuit 38 is for performing telephone communication with the MFP 1 or an external apparatus (not shown) connected to the MFP 1 via the telephone network 100 and performing Internet telephone communication with the PC 51 that is connected to the MFP 1 via Internet 200. The transmission/reception circuit 38 is connected to a microphone (not shown) and a speaker (not shown). The microphone (not shown) transforms sound into an audio signal and inputs the audio signal into the transmission/reception circuit 38, while the speaker (not shown) transforms an audio signal inputted from the transmission/reception circuit 38 into sound and outputs the sound to the outside. The speaker (not shown) also outputs various sounds (such as an operation sound of the operation keys 36, a warning sound when an error occurs or a call sound when a call signal is received).

The digital wireless interface 39 is connected to a wireless antenna 47 and is for performing wireless communication with the MFP 1. When the wireless handset 2 is activated by the Internet telephone key 36a to perform the Internet telephone communication with the PC 51, the transmission/reception circuit 38 and the digital wireless interface 39 are connected with each other and the wireless handset 2 is wirelessly connected to the MFP 1. Then, the wireless handset 2 performs the Internet telephone communication with the PC 51 by the MFP 1 executing the Internet telephone program that corresponds to the user ID of the wireless handset 2 and that is resident in the Internet telephone program resident region 13b.

Next, the Internet telephone program collectively launching process executed by the CPU 11 of the MFP 1 will be described with reference to FIG. 3. FIG. 3 is a flowchart of the Internet telephone program collectively launching process. This process is for collectively launching the Internet telephone program that corresponds to the user ID of the MFP 1 and the Internet telephone programs that correspond to the user IDs of the wireless handsets whose power source is on among all the wireless handsets connectable to the MFP 1. The process is started being executed when the power source of the MFP 1 is turned on by means of the power key 15b or when the Internet telephone function flag 14a is switched from off to on.

In the process, the CPU 11 first confirms whether or not the Internet telephone function flag 14a is on (S301). If the Internet telephone function flag 14a is off (S301: No), the process is simply ended. Thus, the Internet telephone programs are prevented from being started by setting off the Internet telephone function flag 14a.

If, on the other hand, the Internet telephone function flag 14a is on (S301: Yes), the CPU 11 launches the Internet telephone program for the user ID of the MFP 1. More specifically, the CPU 11 identifies the storage address of the Internet telephone program that corresponds to the MFP 1 by referring to the user ID table 14c based on the identification number "0" of the MFP 1, and starts executing the Internet telephone program on the Internet telephone program region 14b and makes the Internet telephone program be resident in the Internet telephone program resident region 13b (S302). As a result, the Internet telephone program is launched for the user ID of the MFP 1, resulting in that the Internet telephone function becomes available to the MFP 1.

It is noted that if this process of FIG. 3 is started when the Internet telephone function flag 14a is switched from off to on, it is known that the Internet telephone function flag is on. Therefore, the process of S301 may be omitted from the process of FIG. 3.

After completing the process of S302, the CPU 11 judges whether or not each of the wireless handsets that can be connected to the MFP 1 is available. Then, the CPU 11 launches the Internet telephone program that corresponds to each of the user IDs of the wireless handsets that are judged to be available. In this operation, the CPU 11 repeatedly performs a judging operation to judge whether or not a wireless handset that corresponds to the identification number indicated by the identification number counter 13a is available, while sequentially incrementing one by one the identification number counter 13a.

More specifically, in S303 the CPU 11 sets "1" in the identification number counter 13a. Then, the program proceeds to S304 in order to judge whether or not the wireless handset 2 having the identification number of "1" is available.

More specifically, in S304, the CPU 11 judges whether or not the identification number presently indicated by the identification number counter 13a is registered in the user ID table 14c. If the identification number indicated by the identification number counter 13a is not registered in the user ID table 14c (S304: No), it is known that no wireless handset that is identified by the current identification number exists in the communication apparatus T. So, the process goes directly to S308.

If, on the other, the identification number indicated by the identification number counter 13a is registered in the user ID table 14c (S304: Yes), the MFP 1 transmits a response-request signal to the wireless handset indicated by the identification number counter 13a (S305).

If the power source of the wireless handset, to which the response-request signal is transmitted from the MFP 1, is ON and the CPU 32 of the wireless handset detects the reception of the response-request signal, the wireless handset transmits a response signal to the MFP 1.

After executing the process of S305, the CPU 11 in the MFP 1 judges in S306 whether or not there is a response received from the wireless handset indicated by the identification number counter 13a. If there is no response signal transmitted from the wireless handset indicated by the identification number counter 13a within a prescribed period of time (S306: No), it is estimated that the power source of the wireless handset is highly likely not ON and therefore is not available. So, the CPU 11 does not start the Internet telephone program that corresponds to the user ID of the wireless handset and the process moves directly to S308. As a result, the Internet telephone program resident region 13b is prevented from being occupied with an Internet telephone program not to be used.

If, on the other hand, there is a response signal transmitted from the wireless handset indicated by the identification number counter 13a within the prescribed period of time (S306: Yes), it is known that the power source of the wireless handset is on and therefore the wireless handset is available. So, the CPU 11 identifies the Internet telephone program storage address that corresponds to the user ID of the wireless handset indicated by the identification number counter 13a with reference to the user ID table 14c, launches the Internet telephone program from the Internet telephone program region 14b, and makes the Internet telephone program become resident in the Internet telephone program resident region 13b (S307). Thus, if the wireless handset indicated by the identification number counter 13a is available, the Internet telephone program that corresponds to the user ID of the wireless handset is started being executed and hence the Internet telephone function becomes available at the wireless handset.

In S308, the CPU 11 judges whether or not a judgement as to whether or not a response is received has been executed for all the wireless handsets registered in the user ID table 14c. If the CPU 11 has not yet performed the judgement as to whether or not a response signal is received for all the wireless handsets registered in the user ID table 14c (S308: No), the CPU 11 increments the identification number counter 13a by one (S309) and returns to S304. The CPU 11 judges whether or not the next wireless handset is available by executing the processes of S304 through S306 and, if the next wireless handset is available, the CPU 11 launches in S307 the Internet telephone program that corresponds to the user ID of the wireless handset.

The CPU 11 repeats the process of S304 through S309 until the judgement as to whether a response signal is received has been executed for all the wireless handsets registered in the user ID table 14c. After the judgement as to whether a response signal is received has been executed for all the registered wireless handsets (S308: Yes), the CPU 11 ends the process. Thus, the CPU 11 checks whether each of all the wireless handsets that can be connected to the MFP 1 is available, and starts executing the Internet telephone program that corresponds to each of all the wireless handsets that are determined as available.

By executing the Internet telephone program collectively launching process in this way, it is possible to start the Internet telephone program that corresponds to the user ID of the MFP 1 and the Internet telephone programs that correspond to all the user IDs of the wireless handsets that are being available when the process is executed. Then, the MFP 1 and the wireless handsets can perform the Internet telephone communication simultaneously, using the started Internet telephone programs corresponding to the user IDs associated therewith.

The process is executed when the power source of the MFP 1 is turned on or when the Internet telephone function flag 14$a$ is switched from off to on. Then, the Internet telephone programs that correspond to the user IDs of all the wireless handsets that are available at that time are started. Thus, by simply turning on the power source of the MFP 1 or switching the Internet telephone function flag from off to on, the user can utilize all the wireless handsets that are available at that time to perform the Internet telephone function without executing any particular additional operation.

Next, the Internet telephone program individually launching process executed by the CPU 11 of the MFP 1 will be described with reference to FIG. 4A. FIG. 4A is a flowchart of the Internet telephone program individually launching process. This process is executed by the MFP 1 to start the Internet telephone program that corresponds to the user ID of a wireless handset whose power source is turned on. The process is executed periodically so long as the power source of the MFP 1 is being on.

In the process, as in the case of the process in S301 of FIG. 3, first in S401, the CPU 11 confirms whether or not the Internet telephone function flag is on. If the Internet telephone function flag is off (S401: No), the CPU 11 ends this process.

If, on the other hand, the Internet telephone function flag is on (S401: Yes), in S402 the CPU 11 judges whether or not a power-on signal has been transmitted from any wireless handset that can be connected to the MFP 1. If there is no power-on signal transmitted from any wireless handset that can be connected to the MFP 1 (S402: No), the CPU 11 determines that there is no wireless handset whose power source has turned on and ends the process. If, on the other hand, there is a wireless handset that can be connected to the MFP 1 and that has transmitted a power-on signal to the MFP 1(S402; Yes), the CPU 11 checks the identification number of the wireless handset whose power source has turned on (S403). As a result, the CPU 11 identifies the wireless handset whose power source is turned on.

Subsequently, the MFP 1 identifies the Internet telephone program storage address that corresponds to the user ID of the wireless handset, whose power source has turned on, by referring to the user ID table 14$c$ based on the identification number checked by the process of S403. Then, the MFP 1 starts executing the Internet telephone program from the Internet telephone program region 14$b$ and makes the program resident in the Internet telephone program resident region 13$b$ (S404). As a result, the wireless handset whose power source has turned on becomes able to perform the Internet telephone communication. The MFP 1 ends the process after completing the process of S404.

In this way, when the Internet telephone program individually launching process is started being executed, the MFP 1 judges whether there is a wireless handset whose power source has turned on and, if there is a wireless handset whose power source has turned on, the MFP 1 starts executing the Internet telephone program that corresponds to the user ID of the wireless handset and makes the Internet telephone program resident in the Internet telephone program resident region 13$b$. Thus, by simply turning on the power source of the wireless handset, the user can perform the Internet telephone communication by using the wireless handset without performing any other additional operation.

Next, the Internet telephone program individually ending process executed by the CPU 11 of the MFP 1 will be described with reference to FIG. 4B. FIG. 4B is a flowchart of the Internet telephone program individually ending process. This process is executed by the MFP 1 to individually end the Internet telephone program that corresponds to the user ID of a wireless handset whose power source has turned off. The process is executed periodically so long as the power source of the MFP 1 is being on.

In this process, the CPU 11 first judges whether or not the Internet telephone function flag is on (S405), the CPU 11 simply ends the process if the Internet telephone function flag is off (S405: No) because the Internet telephone programs have not started and hence are not resident in the Internet telephone program resident region 13$b$.

If, on the other hand, the Internet telephone function flag is on (S405: Yes), in S406 the CPU 11 judges whether or not a power-off signal has been transmitted from any wireless handset that can be connected to the MFP 1. If there is no power-off signal transmitted from any wireless handset that can be connected to the MFP 1 (S406: No), the CPU 11 confirms that there is no wireless handset whose power source has turned off and ends the process. If, on the other hand, there is a wireless handset that can be connected to the MFP 1 and that has transmitted a power-off signal to the MFP 1 (S406; Yes), the CPU 11 checks the identification number of the wireless handset whose power source has been turned off (S407). As a result, the CPU 11 identifies the wireless handset whose power source has turned off.

Subsequently, in S408 the CPU 11 identifies the user ID of the wireless handset, whose power source has been turned off, by referring to the user ID table 14$c$ based on the identification number checked in the process of S407. Then the CPU 11 releases a part of the Internet telephone program resident region 13$b$ where the Internet telephone program that corresponds to the identified user ID is resident. As a result, the Internet telephone program that corresponds to the user ID of the wireless handset whose power source is turned off is ended. The CPU 11 ends the process after completing the process of S408.

In this way, when the Internet telephone program individually ending process is executed, the CPU 11 judges whether there is some wireless handset whose power source has been turned off. If there is a wireless handset whose power source has been turned off, the CPU 11 ends the Internet telephone program that has been started for the user ID of the wireless handset. Then, the MFP 1 releases the Internet telephone program resident region 13$b$ where the Internet telephone program corresponding to the wireless handset is resident. The CPU 11 can allocate the released memory region of the RAM 13 as a region for storing various programs to be executed by the CPU 11 and related data.

Now, the wireless handset adding process that the CPU 11 of the MFP 1 executes will be described by referring to FIG. 5. FIG. 5 is a flowchart of the wireless handset adding process. This process is started being executed when a user inputs to the MFP 1 his/her instruction to add a wireless handset to the communication apparatus T.

This wireless handset adding process includes: a process of assigning an identification number to the wireless handset to be added and adding the wireless handset to the communication apparatus T (S501 through S503); a process of setting a user ID for the added wireless handset (S504 through S507, S511); and a process of downloading an Internet telephone program corresponding to the added wireless handset, storing the Internet telephone program in the Internet telephone program region 14b of the flash memory 14 and launching the program (S508 through S510).

In the process of assigning an identification number to the wireless handset to be added and adding the added wireless handset to the communication apparatus T, the user is prompted to input, into both of the MFP 1 and the wireless handset to be added, an identification number of the wireless handset to be added into the communication apparatus T. When the identification number inputted to the MFP 1 and the identification number inputted to the wireless handset to be added agree with each other, the MFP 1 identifies the wireless handset to be added and assigns the inputted identification number to the wireless handset to be added.

More specifically, in S501 the CPU 11 displays on the LCD 16 an input screen for inputting the identification number to be assigned to the wireless handset to be added. The user is prompted to input the identification number desired to be assigned to the wireless handset to be added. Then, in S502 the CPU 11 judges whether or not an identification number is inputted by the user by manipulating the character keys 15c. And, if the identification number is not inputted by the user within a prescribed period of time (S502: No), the CPU 11 displays on the LCD 16 a message saying that the user's attempt of adding a wireless handset has failed and end the process. If, on the other hand, an identification number is inputted by the user within the prescribed period of time (S502: Yes), the CPU 11 advances to S503.

The wireless handset to be added also displays an input screen the same as the input screen that the MFP 1 displays in S501 urging the user to input the identification number of the wireless handset to be added. When the user inputs the identification number by manipulating the operation keys 36 of the wireless handset to be added, the wireless handset notifies the MFP 1 of the inputted identification number.

In S503, the CPU 11 judges whether or not the identification number that is inputted in S502 and the identification number that is notified by the to-be-added wireless handset agree with each other. If the identification numbers do not agree with each other (S503: No), the CPU 11 displays on the LCD 16 a message saying that the user's attempt to add the wireless handset has failed and the process is ended. If, on the other hand, the identification numbers agree with each other (S503: Yes), the CPU 11 specifies the wireless handset, into which the identification number the same as the identification number inputted to the MFP 1 has been inputted, as a wireless handset added to the communication apparatus T and assigns the identification number inputted in S502 to the added wireless handset as the identification number thereof. When an identification number is thus assigned to the wireless handset added, the MFP 1 becomes able to discriminate the added wireless handset from the other wireless handsets, so that the process of adding the wireless handset is completed at this stage.

Subsequently, in the process of setting a user ID for the added wireless handset, in S504 the CPU 11 first displays on the LCD 16 a screen for checking/altering the user ID of the added wireless handset. Now, the screen for checking/altering the user ID for the added wireless handset that is displayed on the LCD 16 will be described below by referring to FIG. 2B. FIG. 2B is a schematic illustration of the user ID checking/altering screen for the added wireless handset 4 displayed on the LCD 16.

The user ID checking/altering screen for the added wireless handset indicates a user ID candidate for the added wireless handset that is automatically generated by the MFP 1. The screen receives any alteration to the user ID candidate if the user wants to alter the user ID candidate. As shown in FIG. 2B, the LCD 16 displays: a character string "identification number 3" that indicates the identification number which has been assigned to the wireless handset 4 in S501 through S503; and also a character string "user ID xyz3" that indicates a user ID candidate for the added wireless handset 4 along with a cursor arranged immediately to the right of the character string showing the user ID candidate.

In S504, the user ID candidate that is automatically generated by the MFP 1 is displayed in an ID candidate display region of the user ID checking/altering screen. The MFP 1 automatically generates the user ID candidate "xyz3" for the added wireless handset 4 by adding the user ID "xyz" of the MFP 1 with the identification number "3" of the added wireless handset 4.

Now, returning to FIG. 5, after completing S504, the CPU 11 receives an input by the user manipulating the operation keys 15 (S505), and checks whether or not the OK button (not shown) that is included in the operation keys 15 is depressed (S506). If the OK button is depressed (S506: Yes), the CPU 11 sets the user. ID candidate displayed in the ID candidate display region of the user ID checking/altering screen as the user ID of the added wireless handset (S507) and then advances to S508.

In other words, if the OK button in the operation keys 15 is depressed first after the process of S504 is completed, the user ID candidate that is automatically generated by the MFP 1 is set as the user ID of the added wireless handset. Since the MFP 1 automatically generates a user ID candidate for the added wireless handset, the user ID of the added wireless handset can be determined more easily in comparison with the case where the user is required to set a user ID for the added wireless handset. Additionally, the user ID candidate is automatically generated by adding the user ID that is assigned to the MFP 1 in the Internet with the identification number of the added wireless handset 4. So, by setting the thus automatically-generated user ID candidate as the user ID for the added wireless handset, other users of the Internet telephone communication can easily and correctly guess that the user ID is of the wireless handset added to the MFP 1.

When, on the other hand, the OK button is not depressed (S506: No), the CPU 11 changes the user ID checking/altering screen according to the input made by the user operating the operation keys 15 (S511). For example, when an arrow key (not shown) is depressed, the CPU 11 moves the cursor shown in the user ID checking/altering screen on the LCD 16. When a deletion key is depressed, the CPU 11 deletes a single character from the user ID candidate at the cursor position. When a character key is depressed, the CPU 11 adds a character indicated by the character key at the cursor position.

After completing the process of S511, the process moves back to S505. Then, the process of S505, S506 and S511 are repeated until the OK button is depressed in S506 (S506: Yes). With the above-described process, the user can replace the character string of the user ID candidate, which is being displayed on the user ID candidate display region, with some other character string. For example, the user ID candidate "xyz3" for the added wireless handset 4 can be replaced with "abc".

When the OK button is depressed (S506: Yes), the CPU 11 sets the user ID candidate, which is now being displayed on the user ID candidate display region, as the user ID of the added wireless handset (S507) and advances to S508. In this way, when the user wants to alter the user ID candidate that is automatically generated by the MFP 1 or when a user ID the same as the user ID candidate that is automatically generated by the MFP 1 is already being used for some other user, the user can replace the user ID candidate with the user's inputted user ID candidate, and sets the user's inputted user ID candidate as the user ID of the added wireless handset.

In S508, the CPU 11 downloads the Internet telephone program from a server (not shown) that operates on the Internet 200 and that manages the Internet telephone communication. The CPU 11 stores the downloaded program in the Internet telephone program region 14*b*, associating the program with the user ID of the added wireless handset that has been set in S507. As a result, the Internet telephone program dedicated to the user ID of the added wireless handset is stored in the Internet telephone program region 14*b*.

Subsequently, the CPU 11 stores in the user ID table 14*c* the identification number that has been assigned to the added wireless handset through S501-S503 in association with the user ID of the added wireless handset that is determined in S507 and the storage address of the Internet telephone program that is stored in S508 (S509). The user ID and the Internet telephone program storage address for the added wireless handset become capable of being managed by the identification number of the added wireless handset.

Finally, the CPU 11 starts executing the Internet telephone program that corresponds to the user ID of the added wireless handset from the Internet telephone program region 14*b* and makes the Internet telephone program become resident in the Internet telephone program resident region 13*b* (S510), before ending the process of adding a wireless handset. As a result, the added wireless handset becomes able to perform the Internet telephone communication.

Thus, a user ID is set for the added wireless handset in the process of adding a wireless handset. The user does not need to set a user ID for the added wireless handset after completing the process of adding the wireless handset to the communication apparatus T. Thus, a user ID can be set easily for the added wireless handset.

Next, will be described below with reference to FIGS. 6 through 8 the process that is executed when the MFP 1 makes an Internet telephone call or receives an Internet telephone call by way of the MFP 1, the wireless handset 2 or the wireless handset 3.

FIG. 6 is a flowchart of the MFP Call transmission process executed by the CPU 11 of the MFP 1. This process is executed in order to make an Internet telephone call at the MFP 1. The process is started when the Internet telephone key 15*a* of the MFP 1 is depressed.

In this process, first the CPU 11 judges whether or not the Internet telephone function flag 14 is on (S601). If the Internet telephone function flag 14*a* is off (S601: No), it is known that the MFP 1 is not able to perform Internet telephone communication and hence the CPU 11 displays on the LCD 16 an error message saying that Internet telephone communication is not available and ends the process.

If, on the other hand, the Internet telephone function flag 14*a* is on (S601: Yes), the CPU 11 requests the Internet telephone program that corresponds to the user ID of the MFP 1 and that is resident in the Internet telephone program resident region 13*b* to acquire a contact list from an Internet Protocol telephone server that is provided in the Internet 200. This contact list lists up the users who can perform Internet telephone communication (S602).

After completing the process of S602, the CPU 11 checks whether or not the Internet telephone program has acquired the contact list (S603). If the Internet telephone program has not acquired the contact list within a prescribed period of time (S603: No), the CPU 11 displays on the LCD 16 a message saying that the attempted acquisition of the contact list has failed and ends the process.

If, on the other hand, the Internet telephone program has acquired the contact list within the prescribed period of time (S603: Yes), the CPU 11 displays the acquired contact list on the LCD 16 (S604). The user can select a call target, whom the user desires to call, from the contact list displayed on the LCD 16 by operating the arrow key (not shown) among the operation keys 16.

Subsequently, in S605 the CPU 11 judges whether or not any call target is selected by the user from the contact list. If any call target is not selected within a prescribed period of time (S605: No), the CPU 11 displays a message saying that a call target is not selected on the LCD 16, and ends the process.

If, on the other hand, some call target is selected within the prescribed period of time (S605: Yes), the CPU 11 notifies the call target selected by the user to the Internet telephone program that corresponds to the user ID of the MFP 1, and requests the Internet telephone program to execute a calling process (S606). As a result, the Internet telephone program sends a call signal to the call target.

After completing the process of S606, in S607 the CPU 11 judges whether or not the called party answers. If the called party does not answer within a prescribed period of time (S607: No), the CPU 11 displays on the LCD 16 a message saying that the called party does not answer, and ends the process.

If, on the other hand, the called party answers within the prescribed period of time, the CPU 11 establishes a telephone call via the Internet telephone program that corresponds to the user ID of the MFP 1 (S608), and ends the process. As a result, the MFP 1 communicates with the called party via the Internet telephone program that corresponds to the user ID of the MFP 1.

FIG. 7 is a flowchart of a wireless handset (ID No. 1) call transmission process executed by the MFP 1. This process is executed by the MFP 1 in order to allow the wireless handset 2 having the identification number "1" to perform an Internet telephone call. This process is started when the Internet telephone key 36*a* of the wireless handset 2 is depressed. Note that the wireless handset 3 (ID No. 2) makes an Internet telephone call by the MFP 1 executing a process the same as the calling process for the wireless handset 2 (ID No. 1).

In this process, first the CPU 11 judges whether or not the Internet telephone function flag 14 is on (S701). If the Internet telephone function flag 14*a* is off (S701: No), the CPU 11 notifies the wireless handset 2 error information informing that Internet telephone communication is not available and ends the process.

If, on the other hand, the Internet telephone function flag 14*a* is on (S701: Yes), in S702 the CPU 11 judges whether or not the Internet telephone program that corresponds to the user ID of the wireless handset 2 is resident in the Internet telephone program resident region 13*a*. It is noted that when the Internet telephone program collectively launching process illustrated in FIG. 3 or the Internet telephone program individually launching process illustrated in FIG. 4A is executed, if wireless signals are not exchanged sufficiently properly between the MFP 1 and the wireless handset, the MFP 1 cannot recognize the power-on state of the wireless handset even though the power source of the wireless handset 2 is on, and therefore the Internet telephone program that corresponds to the user ID of the wireless handset 2 is not started in the MFP 1. The process of S702 is executed in order to cope with this situation.

If the Internet telephone program that corresponds to the user ID of the wireless handset 2 is not resident in the Internet telephone program resident region 13*a* (S702: No), the CPU 11 starts the Internet telephone program that corresponds to the user ID of the wireless handset 2 from the Internet telephone program region 14*b* and makes the Internet telephone program resident in the Internet telephone program resident region 13*b* (S710). As a result, Internet telephone communication becomes available at the wireless handset 2. After completing the process of S710, the CPU 11 advances to the process of S703.

If, on the other hand, the Internet telephone program that corresponds to the user ID of the wireless handset 2 is already resident in the Internet telephone program resident region 13*a* (S702: Yes), Internet telephone communication is available at the wireless handset 2 and hence the CPU 11 simply advances to S703.

In S703, the MFP 1 requests the Internet telephone program that corresponds to the user ID of the wireless handset 2 to acquire the contact list (S703).

After completing the process of S703, the CPU 11 checks whether or not the Internet telephone program has acquired the contact list (S704). If the Internet telephone program has not acquired the contact list within a prescribed period of time (S704: No), the CPU 11 notifies the wireless handset 2 of error information saying that the attempted acquisition of the contact list has failed and ends the process.

If, on the other hand, the Internet telephone program acquires the contact list within the prescribed period of time (S704: Yes), the CPU 11 sends the acquired contact list to the wireless handset 2 (S705). Then, the contact list is displayed on the LCD 37 of the wireless handset 2. When the user selects a call target from the contact list by operating the operation keys 37, the call target is notified to the MFP 1.

After completing the process of S705, the CPU 11 judges whether or not any call target is selected by the user on the basis of the notification from the wireless handset 2 (S706). If the call target is not selected within a prescribed period of time (S706: No), the CPU 11 sends an error message to the wireless handset 2, saying that no call target is selected, and ends the process.

If, on the other hand, a call target is selected within the prescribed period of time (S706: Yes), the CPU 11 notifies the call target selected by the user to the Internet telephone program that corresponds to the user ID of the wireless handset 2 and requests the Internet telephone program to execute a calling process (S707). As a result, the Internet telephone program that corresponds to the user ID of the wireless handset 2 sends a call signal to the user's selected call target.

After completing the process of S707, in S708 the CPU 11 judges whether or not a called party answers to the call. If the called party does not answer within a prescribed period of time (S708: No), the CPU 11 notifies to the wireless handset 2 a message saying that the called party does not answer and ends the process.

If, on the other hand, the called party answers within the prescribed period of time, the CPU 11 establishes a telephone call by way of the Internet telephone program that corresponds to the user ID of the wireless handset 2 (S709) and ends the process. As a result, the wireless handset 2 can communicate with the called party by means of the Internet telephone program that corresponds to the user ID of the wireless handset 2.

FIG. 8 is a flowchart of the call receiving process executed by the CPU 11 of the MFP 1. The call receiving process is started being executed when the Internet telephone program that corresponds to either one of the user IDs of the MFP 1, the wireless handset 1 and the wireless handset 2 receives a call from the PC 51.

In this process, in S801 the CPU 11 first identifies the identification number i of a called device according to the user ID of the Internet telephone program that has received the call by referring to the user ID table 14*c*. As a result, the called party is determined to be either the MFP 1, the wireless handset 2 or the wireless handset 3.

Then, in S802 the CPU 11 judges whether or not the called party is the MFP 1 on the basis of the identification number i. If the called party is the MFP 1 (S802: Yes), the CPU 11 advances the process to S803, wherein the CPU 11 controls the speaker 17 of the MFP 1 to output a ringing sound or a call receiving sound.

Then, in S804 the CPU 11 judges whether or not the Internet telephone key 15*a* of the MFP 1 is depressed. If the Internet telephone key 15*a* is depressed within a prescribed period of time (S804: Yes), the CPU 11 establishes a telephone communication by way of the Internet telephone program that corresponds to the user ID of the MFP 1 (S805) and ends the process. Thus, the MFP 1 can communicate with the calling party by way of the Internet telephone program that corresponds to the user ID of the MFP 1. If, on the other hand, the Internet telephone key 15*a* is not depressed within the prescribed period of time (S804; No), the CPU 11 determines that the user is not able to answer the incoming call and ends the process without responding to the call from the PC 51.

If the CPU 11 determines that the called party is not the MFP 1 (S802: No), in S806 the CPU 11 notifies reception of the call to the wireless handset, to which the identification number i is assigned (to be referred to as "wireless handset with identification number i" hereinafter), by way of the digital wireless interface 25 and the wireless antenna 26. When the wireless handset with identification number i is notified by the MFP 1 of the incoming call, the wireless handset with identification number i outputs a call receiving sound by controlling the speaker connected to the transmission/reception circuit 38. When the Internet telephone key 36*a* of the wireless handset with identification number i is depressed, the wireless handset notifies the MFP 1 that the Internet telephone key 36*a* is depressed.

After completing the process of S806, in S807 the CPU 11 judges whether or not the Internet telephone key 36*a* is depressed on the wireless handset with identification number i according to the presence or absence of notification from the wireless handset with identification number i. If the Internet telephone key 36*a* is depressed within a prescribed period of time (S807: Yes), in S808 the CPU 11 establishes a telephone communication by way of the Internet telephone program that corresponds to the user ID of the wireless handset with identification number i and ends the call receiving process. As a result, the wireless handset with identification number i can communicate with the calling party by way of the Internet telephone program that corresponds to the user ID of the wireless handset with identification number i. If, on the other hand, the Internet telephone key 36*a* is not depressed within the prescribed period of time (S808: No), the CPU 11 determines that the user is not able to answer the incoming call and ends the process without responding to the call from the PC 51.

As described above, according to this embodiment, user IDs are set for the MFP 1, the wireless handset 2 and the wireless handset 3 and the Internet telephone program is started for each of the user IDs. Each of the MFP 1, the wireless handset 2 and the wireless handset 3 can make a call and receive a call by the MFP 1 executing the Internet telephone program that corresponds to the user ID thereof. Thus, the MFP 1, the wireless handset 2 and the wireless handset 3 can make Internet telephone communications simultaneously with one another.

While the invention has been described in detail with reference to the embodiment thereof, it would be apparent to those skilled in the art that various changes and modifications may be made therein without departing from the spirit of the invention.

For example, in the above-described embodiment, the Internet telephone function flag 14a is for indicating whether or not the communication apparatus T can use the Internet telephone function. However, the Internet telephone function flag 14a may be modified to indicate whether or not the wireless handsets connected wirelessly to the MFP 1 can use the Internet telephone function. With this modification, it is possible to grasp easily whether the wireless handsets can use the Internet telephone function by using the Internet telephone function flag 14a. In this case, the process of S301 may be executed between S302 and S303 in FIG. 3, and the process of S601 may be omitted from the process of FIG. 6.

The Internet telephone function flag 14a may be further modified to indicate whether or not each of the wireless handsets can use the Internet telephone function. In this case, the process of S305 through S307 is executed for each of the wireless handsets, for which the Internet telephone function flag 14a is ON, whereas the process of S305 through S307 is not executed for each of the other wireless handsets, for which the Internet telephone function flag 14a is off. With this modification, the Internet telephone program is started for the user ID of each wireless handset, for which the Internet telephone function flag 14a is ON, so as to allow the wireless handset to execute the Internet telephone communication. The Internet telephone program can be prevented from being started for the user ID of other wireless handsets, for which the Internet telephone function flag 14a is off. Thus, it is possible to easily manage whether or not to allow the wireless handsets to perform Internet telephone communication.

With the embodiment described above, when a wireless handset is added to the communication apparatus T, the Internet telephone program is downloaded in S508 of FIG. 5 from the server (not shown) that manages Internet telephone communication, and is stored in the Internet telephone program region 14b in association with the user ID of the added wireless handset that is set in the process of S507. However, the Internet telephone program may be stored in advance in the ROM 12 of the MFP 1 and, when a wireless handset is added to the communication apparatus T, the Internet telephone program may be associated with the user ID of the added wireless handset and copied to the Internet telephone program region 14b. In this case, the Internet telephone program can be stored in the Internet telephone program region 14b within a shorter period of time in comparison with the case where the Internet telephone program is downloaded from the Internet 200.

In the above-described embodiment, the Internet telephone programs that are dedicated to the respective user IDs are stored in the Internet telephone program region 14b. However, if the same Internet telephone program can be used for a plurality of users, only a single Internet telephone program may be stored in the Internet telephone program region 14b. In this case, the capacity of the Internet telephone program region 14b can be made small. By repeatedly starting the same Internet telephone program to reside in the Internet telephone program resident region 13b for the respective user IDs, it is possible to perform Internet telephone communication at the MFP 1, the wireless handset 2 and the wireless handset 3 simultaneously.

The communication apparatus T assigns identification numbers respectively to the MFP 1 and the plurality of wireless handsets that can be connected to the MFP 1 in the embodiment described above. Instead, the communication apparatus T may assign identification numbers respectively only to the plurality of wireless handsets that can be connected to the MFP 1. Because there is only a single MFP 1 in the communication apparatus T, the MFP 1 can be identified with ease even though no identification number is assigned to the MFP 1. In this case, "0" may be assigned to the MFP 1 as a provisional identification number 14c1 in the user ID table 14c.

While a plurality of wireless handsets (the wireless handset 2 and the wireless handset 3) are connected to the MFP 1 in the above-described embodiment, it is essential that at least one wireless handset is connected to the MFP 1.

What is claimed is:

1. A communication apparatus comprising:
a main unit configured to connect to the Internet; and
at least one secondary unit that is configured to connect to the Internet via the main unit
the main unit comprising:
a communication control unit that is configured to control telephone communication with an external apparatus via the Internet;
a storing unit that is configured to store at least one user ID assigned individually to at least one user authorized to use the communication control unit in association with the main unit and the at least one secondary unit; and
an activating unit that is configured to activate the communication control unit for each user ID,
wherein the main unit further comprises a response-request signal transmission unit that is configured to, when the power source of the main unit is turned on, transmit a response-request signal prompting each secondary unit to respond to the response-request signal,
wherein each secondary unit comprises a response transmission unit that is configured to transmit a response upon receiving the response-request signal while the power ource of the secondary unit is on,
wherein the activating unit is configured to activate, upon receiving a response, the communication control unit with respect to the user ID of a secondary unit that has transmitted the response,
wherein the main unit further comprises a setting unit that is configured to set a mode in which the main unit is allowed to perform telephone communication with an external apparatus, and
wherein the response-request signal transmission unit is configured to transmit the response-request signal to each secondary unit when the power source of the main unit is turned on and the setting unit sets the mode in which the main unit is allowed to perform telephone communication.

2. The communication apparatus according to claim 1, wherein the communication apparatus has a plurality of secondary units; and
the storing unit is configured to store a plurality of identification numbers of identifying the plurality of secondary units in association with the user IDs of the secondary units.

3. The communication apparatus according to claim 2, wherein the main unit further comprises:

an identification number assigning unit that is configured to assign an identification number to a secondary unit to be added;
a user ID setting unit that is configured to set a user ID for the secondary unit to be added; and
a writing unit that is configured to write into the storing unit the identification number assigned by the identification number assigning unit and the user ID set by the user ID setting unit in association with each other.

4. The communication apparatus according to claim 3, wherein the main unit further comprises a user ID generating unit that is configured to generate a user ID for the secondary unit to be added based on the user ID of the main unit and the identification number assigned to the secondary unit to be added by the identification number assigning unit; and
wherein the user ID setting unit is configured to set the user ID generated by the user ID generating unit as the user ID of the secondary unit to be added.

5. The communication apparatus according to claim 4, wherein the main unit further comprises:
an input unit that is configured to input a character;
a user ID replacing unit that is configured to replace the user ID generated by the user ID generation unit with a character string inputted by the input unit, and
wherein the user ID setting unit is configured to set the user ID replaced by the user ID replacing unit as the user ID of the secondary unit to be added.

6. A communication apparatus comprising:
a main unit configured to connect to the Internet; and
at least one secondary unit that is configured to connect to the Internet via the main unit,
the main unit comprising:
a communication control unit that is configured to control telephone communication with an external apparatus via the Internet;
a storing unit that is configured to store at least one user ID assigned individually to at least one user authorized to use the communication control unit in association with the main unit and the at least one secondary unit; and
an activating unit that is configured to activate the communication control unit for each user ID,
wherein each secondary unit further comprises a power on signal transmission unit that is configured to transmit a power on signal to the main unit when the power source of the secondary unit is turned on, and
wherein upon receiving a power on signal, the activating unit is configured to activate the communication control unit with respect to a user ID of a secondary unit that has transmitted the power on signal.

7. A communication apparatus comprising:
a main unit configured to connect to the Internet; and
at least one secondary unit that is configured to connect to the Internet via the main unit,
the main unit comprising:
a communication control unit that is configured to control telephone communication with an external apparatus via the Internet;
a storing unit that is configured to store at least one user ID assigned individually to at least one user authorized to use the communication control unit in association with the main unit and the at least one secondary unit; and
an activating unit that is configured to activate the communication control unit for each user ID,
wherein each secondary unit further comprises a power off signal transmission unit that is configured to transmit a power-off signal to the main unit when the power source of the secondary unit is turned off, and
the main unit further comprises a stopping unit that is configured to, upon receiving a power off signal, stop the communication control unit with respect to the user ID of a secondary unit that has transmitted the power off signal.

\* \* \* \* \*